(12) United States Patent
Bauer et al.

(10) Patent No.: US 11,661,002 B2
(45) Date of Patent: May 30, 2023

(54) ILLUMINATION UNIT AND VEHICLE

(71) Applicant: DAIMLER AG, Stuttgart (DE)

(72) Inventors: Stefan Bauer, Sindelfingen (DE);
Daniel Betz, Rottenburg-Seebronn (DE); Daniel Fuhrmann, Böblingen (DE); Sebastian Schüler, Pforzheim (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/596,664

(22) PCT Filed: May 8, 2020

(86) PCT No.: PCT/EP2020/062808
§ 371 (c)(1),
(2) Date: Dec. 16, 2021

(87) PCT Pub. No.: WO2020/254037
PCT Pub. Date: Dec. 24, 2020

(65) Prior Publication Data
US 2022/0305985 A1  Sep. 29, 2022

(30) Foreign Application Priority Data
Jun. 17, 2019  (DE) .................... 10 2019 004 298.0

(51) Int. Cl.
*B60Q 3/74* (2017.01)
*B60Q 3/64* (2017.01)
(Continued)

(52) U.S. Cl.
CPC .............. *B60Q 3/745* (2017.02); *B60Q 3/252* (2017.02); *B60Q 3/64* (2017.02); *B60Q 3/82* (2017.02); *B60J 3/0278* (2013.01)

(58) Field of Classification Search
CPC .......... B60Q 3/745; B60Q 3/64; B60Q 3/252; B60Q 3/82
See application file for complete search history.

(56) References Cited

U.S. PATENT DOCUMENTS

| 4,807,093 A | 2/1989 | Cisler |
| 2018/0131908 A1* | 5/2018 | Salter ..................... B60J 3/0204 |

FOREIGN PATENT DOCUMENTS

| DE | 3930122 A1 | 11/1990 |
| DE | 10232797 A1 | 1/2004 |

(Continued)

OTHER PUBLICATIONS

International Search Report dated Jul. 16, 2020 in related/corresponding International Application No. PCT/EP2020/062808.

(Continued)

*Primary Examiner* — Thomas M Sember
(74) *Attorney, Agent, or Firm* — Patent Portfolio Builders PLLC

(57) ABSTRACT

An illumination unit for an interior chamber of a vehicle includes at least one light source integrated into a surface side of a sun shield facing towards an occupant in a non-usage position of the sun shield. The at least one light source emits light in the activated state which is directed towards the occupant. A covering element is provided for covering a light outlet surface of the light source.

9 Claims, 3 Drawing Sheets

(51) Int. Cl.
*B60Q 3/252* (2017.01)
*B60Q 3/82* (2017.01)
*B60J 3/02* (2006.01)

(56) References Cited

FOREIGN PATENT DOCUMENTS

| | | |
|---|---|---|
| DE | 102013016817 A1 | 4/2015 |
| DE | 102016213629 A1 | 2/2018 |
| DE | 102016215593 A1 | 2/2018 |
| DE | 102017006487 A1 | 7/2018 |
| JP | 0650988 U | 7/1994 |
| JP | 2010120445 A | 6/2010 |

OTHER PUBLICATIONS

Office Action created Feb. 19, 2020 in related/corresponding DE Application No. 10 2019 004 298.0.
Written Opinion dated Jul. 16, 2020 in related/corresponding International Application No. PCT/EP2020/062808.

\* cited by examiner

ILLUMINATION UNIT AND VEHICLE

BACKGROUND AND SUMMARY OF THE INVENTION

Exemplary embodiments of the invention relate to an illumination unit and to a vehicle having such an illumination unit.

An interior chamber lighting system for an interior chamber of a vehicle is known from DE 10 2013 016 817 A1. The interior chamber lighting system comprises one or more light sources, sensor means for detecting an illumination strength and a color temperature of a surroundings light, which shines into the interior chamber from outside the vehicle. Furthermore, the interior light system comprises sensor means for detecting an illumination strength and a color temperature in the interior chamber of the vehicle and control means for controlling an illumination strength and a color temperature of the light source or the light sources depending on the detected illumination strength and color temperature of the surroundings light and in the interior chamber of the vehicle.

Moreover, DE 102 32 797 A1 describes a method and a device for increasing the vigilance of a driver of a vehicle. Here, the vehicle driver is supplied at least occasionally and/or at least partially with electromagnetic radiation. The device comprises at least one sensing device for detecting at least one parameter representing a degree of attention of the vehicle driver with at least one source irradiating electromagnetic waves, wherein its reach of efficacy reaches up to a residing position of the vehicle driver. In addition, the device has an evaluation and control device for controlling the at least one source emitting electromagnetic waves depending on signals delivered via the at least one sensing device.

Furthermore, a hinged sun shield for a motor vehicle with a mirror unit is disclosed in DE 10 2017 006 487 A1, wherein the mirror unit can be covered by a covering element. The covering element is designed foldably and consists of a foldable flexible material, which has defined folding behavior.

DE 39 30 122 A1 describes a sun shield provided with a mirror for motor vehicles, which has a shield body that can be pivoted around a folding axis between a non-use position and a use position. The shield body contains an illumination device and is provided with a flap that can be pivoted around an axis parallel to the flap axis, the flap abutting on the shield body with its inside in its closed position and covering both the mirror and the light outlet surface of the illumination device. The mirror is arranged on an inside of the flap, and the light outlet is provided on a front side of the shield body facing a windscreen of the vehicle in the usage position of the shield body. The light outlet surface of the illumination device is formed by a window that deflects the light rays in a direction in which the emerging light rays run in an acute angle opening to a free longitudinal edge of the shield body in relation to the front side of the shield body. This angle is chosen in such a way that the light then falls onto a face of a vehicle occupant when the shield body is in its non-usage position.

Furthermore, U.S. Pat. No. 4,807,093 A describes a vehicle sun shield, comprising a sun shield body with main surfaces pointing forwards and backwards and a cosmetic mirror device, which has a mirror. Here, the cosmetic mirror device is pivotably attached on the sun shield body. The vehicle sun shield comprises an opening, which extends through the sun shield body and through the main surfaces, in order to form an opening through the sun shield. The cosmetic mirror device can be moved out of a position in which it is parallel to rear faces of the sun shield and points backwards when the sun shield is in such a lowered use position that the mirror is exposed through the opening, into a position pivoted away from the sun shield body. Thus, the mirror can be used as a cosmetic mirror when the sun shield is in a raised position in relation to a vehicle body edge. Furthermore, an illumination device is provided that is arranged in such a way that light from the surroundings of the mirror is directed outwardly. The illumination device is attached on the cosmetic mirror device adjacently to the mirror in order to serve as a map lamp when the sun shield is in a lowered user position and the cosmetic mirror device is pivoted away from the sun shield body.

Exemplary embodiments of the invention are directed to an improved illumination unit in comparison to the prior art for an interior chamber of a vehicle having at least one light source and an improved vehicle having such an illumination unit.

An illumination unit for an interior chamber of a vehicle has at least one light source integrated into a surface side of the sun shield facing towards an occupant in a non-usage positions of a sun shield, wherein the at least one light source emits light in the activated state that is directed towards the occupant, and a covering element for covering a light outlet surface of the light source is provided.

Biologically effective light can be emitted by means of the illumination unit, by means of which light the interior chamber of the vehicle can be illuminated, wherein, according to the invention, the at least one light source emits biologically effective light at least in the driving operation of the vehicle outside the visible range of a driver. That is to say, the light is emitted outside the field of vision of the driver if their gaze is directed towards traffic situations in front of the vehicle.

A biologically effective illumination concept can be achieved in the vehicle by means of the illumination unit, wherein the biologically effective light is deflected into an eye region of an occupant, in particular driver, without dazzling them. The illumination element thus constitutes a daylight supplement in the vehicle. The biologically effective light can here have an impact on health, wellbeing, and productive capacity. Due to the fact that the biologically effective light as a daylight supplement can have an impact on the productive capacity of the occupant, the safety for the occupant, for example a driver of the vehicle, and traffic participants in the surroundings of the vehicle can be increase, since the attention of the driver is increased.

By integrating the at least one light source into the surface side of the sun shield, which is facing towards the occupant when the sun shield is not in use, the at least one light source is arranged on a mirror usually present on an opposite surface side of the sun shield, the mirror being able to constitute a cooling surface for the at least one light source. The at least one light source can be cooled, whereby it is possible in certain circumstances to increase the lifetime of the at least one light source.

In addition, the at least one light source is integrated into the surface side facing towards the occupant when the sun shield is not in use, since an additional illumination, in particular the biologically effective light, is mainly used when there is insufficient solar radiation and the sun shield is accordingly in the non-usage position.

The at least one light source, i.e., its light outlet surface, is arranged in the deactivated state to be protected, in particular from dirt and/or damage, by means of the covering element, wherein the at least one light source can be mechanically dimmed to activate and deactivate the at least one light source in the event of a switching element malfunctioning. In such a case, the light outlet surface can thus be covered by means of the covering element.

In an embodiment of the illumination unit, the covering element is effectively connected to a switching unit for activating and deactivating a light source, such that it is not necessary for a user of the illumination unit to actuate an additional operating element for activating the at least one light source. The covering element here forms the actuating element of a switching unit for switching the at least one light source on and off, wherein the covering element can form the switching unit itself.

In a further embodiment of the illumination device, the at least one light source is activated when the covering element is open and deactivated when the covering element is closed, such that the covering element can assume the function of the operating element for switching the at least one light source on and off.

A design of the covering element provides that this is formed as a sliding covering, folding covering, or creasing covering and can be fixed in an open position. Thus, the covering element can be formed comparatively simply and cost-effectively for activating and deactivating the at least one light source or to cover the light outlet surface of the at least one light source, wherein an available constructive space for arranging the covering element and for opening and closing it is used optimally.

In addition, in a development of the illumination unit, at least one detection unit for detecting an illumination strength of a surroundings light of at least one occupant of the vehicle is provided, and the at least one light source can be activated depending on the illumination strength detected. Thus, it can be ensured, as far as possible, that the at least one light source can be activated for emitting the biologically effective light when it is required, wherein an illumination strength and, furthermore, for example, the color temperature of the surroundings light is relatively low corresponding to the time of day.

A possible development provides that the covering element is formed from a material corresponding to that of a cladding of the sun shield, such that a surface structure and a color of the covering element are the same as that of the sun shield and thus a production effort of the sun shield with the covering element can be reduced. Moreover, as a result of such a design of the covering element, a surface of the sun shield formed by the covering element is designed to be extensively unobtrusive.

In a further possible embodiment of the illumination unit, the light outlet surface of the at least one light source is formed to be diffusely scattering, such that the biologically effective light is optimally distributed in relation to an eye position of the occupant and the risk of dazzling the occupant in the activated state of the at least one light source can be substantially precluded.

In a possible design, the at least one light source is formed as an LED surface light, which can be integrated comparably easily into the sun shield and by means of which the biologically effective light can be emitted in a diffusely scattering manner. The light outlet surface of the at least one light source formed in such a way here has a rectangular shape.

Furthermore, the invention relates to a vehicle having an illumination unit which comprises at least one light source, which emits biologically effective light via its light outlet surface, the light being able to have an impact, in particularly a positive impact, on health, wellbeing and productive capacity of an occupant of the vehicle.

Exemplary embodiments of the invention are explained in more detail below by means of the drawings.

BRIEF DESCRIPTION OF THE DRAWINGS

Here are shown.

Parts corresponding to one another are provided with the same reference numerals in all figures.

DETAILED DESCRIPTION

Figure 1:
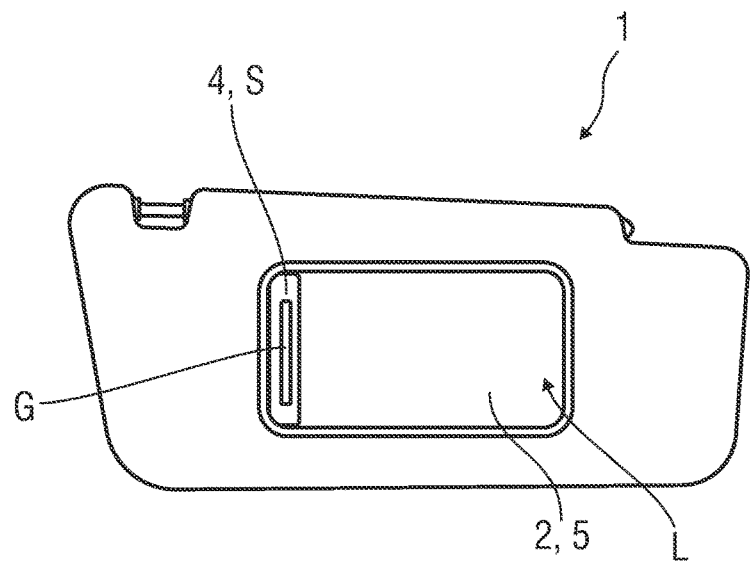
FIG. 1, schematically, a sun shield with integrated illumination unit and open covering element designed as a sliding covering, FIG. 2, schematically, the sun shield with integrated illumination unit and closed covering element formed as a sliding covering, FIG. 3, schematically, the sun shield with a covering element designed as a creasing covering in a closed position, FIG. 4, schematically, the sun shield with the partially folded back covering element designed as the creased covering, FIG. 5, schematically, the sun shield with the covering element designed as a creasing covering in an open position, FIG. 6, schematically, a cut-out of a vehicle with a driver as the occupant and an incident angle range and FIG. 7, schematically, a driver as an occupant and a region of different incident angles.
Figure 2:
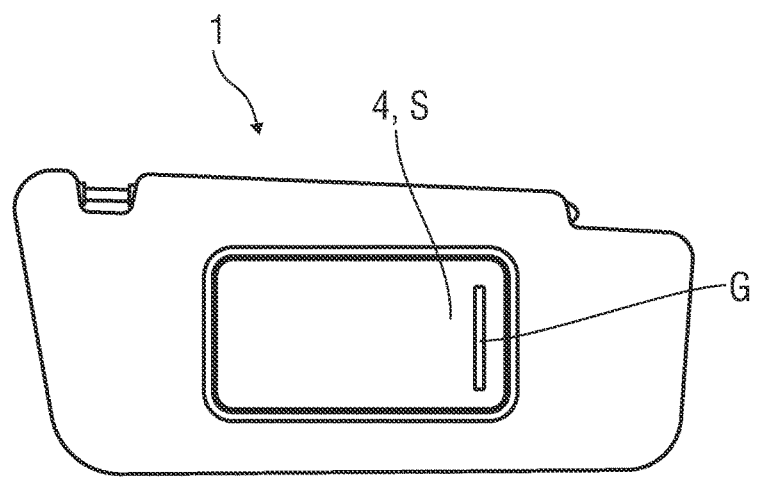
Figure 6:
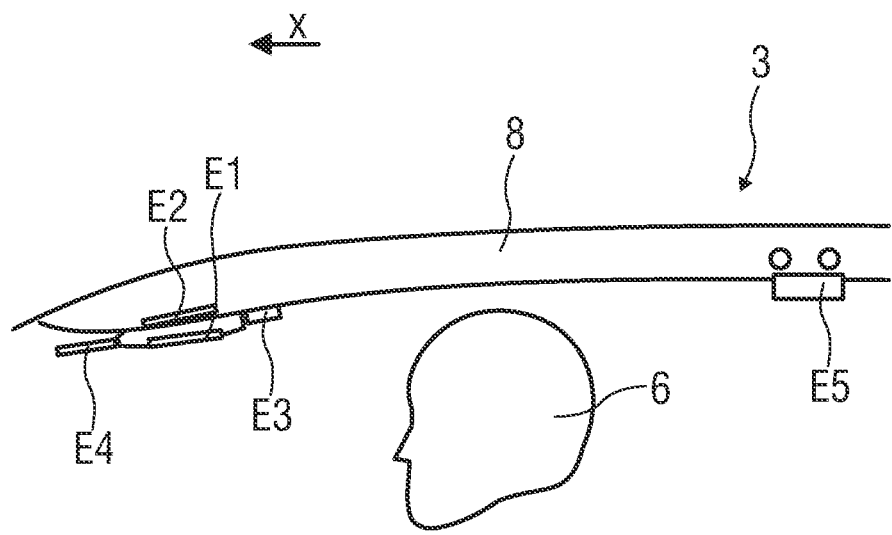
Figure 7:
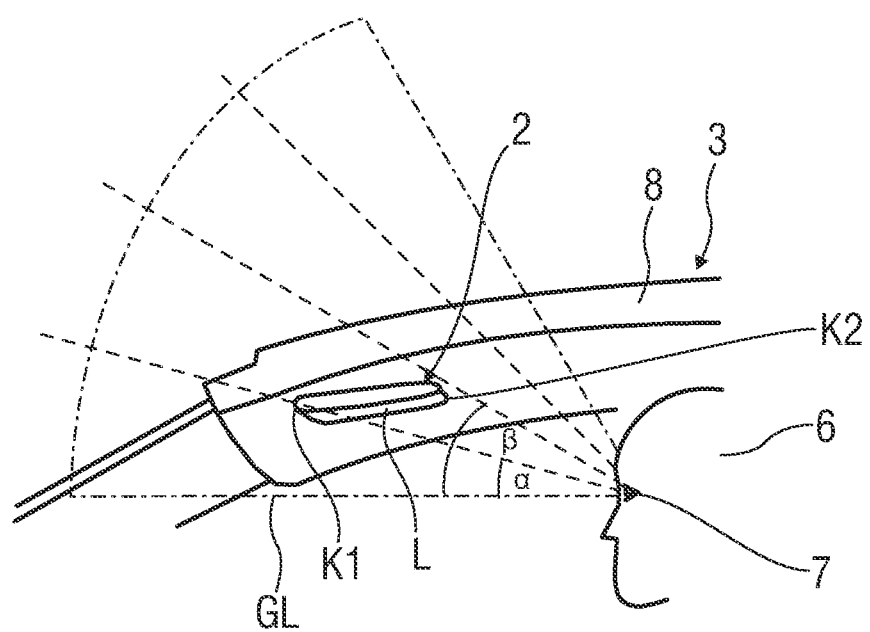

FIGS. 1 and 2 show a sun shield 1 with an integrated illumination unit 2 for a vehicle 3 depicted in sections in FIGS. 6 and 7. A covering element 4 of a light outlet surface L of a light source 5 of the illumination unit 2 is designed as a sliding covering S, wherein this is shown in an open position in FIG. 1 and in a closed position in FIG. 2.

The illumination unit 2 comprises a light source 5, which can be formed as an LED surface light and emits biologically effective light, wherein this is irradiated in a diffusely scattering manner across the light outlet surface L. Here, the light outlet surface L is designed rectangularly to be milky white, wherein the light outlet surface L occupies a comparatively large area in relation to the surface side of the sun shield 1. In an alternative embodiment, more than one light source 5 are provided for irradiating the biologically effective light.

The light source 5 is integrated into a surface side of the sun shield 1, wherein this surface side in a non-usage position is facing towards an occupant 6 shown in FIGS. 6 and 7. If the sun shield 1 is in a usage position, the surface side with the light source 5 is facing away from the occupant 6 and facing towards a windscreen of the vehicle 3 (not shown in more detail). In the usage position of the sun shield 1, this serves to extensively avoid dazzling an occupant 6 of the vehicle 3 by incident sunlight.

Usually, a mirror, in particular a so-called make-up mirror, is arranged on a surface side of the sun shield 1 opposite the illumination unit 2. If the sun shield 1 has such a mirror, then it can serve as a cooling surface for the illumination unit 2, in particular the light source 5.

If the sun shield 1 is in the non-usage position, as shown in FIGS. 1 to 6, the illumination unit 2, in particular the light outlet surface L of the light source 5, integrated into the sun shield 1 is facing towards the occupant 6, wherein, if the covering element 4 has a closed position, the light outlet surface L is covered by means of it.

In addition, the light outlet surface L is arranged on the surface side of the sun shield 1 for user friendliness, which is allocated to the occupant 6 in the non-usage position, since an additional illumination device that can be activated by means of the illumination unit 2 is namely useful when the natural sun radiation is relatively low. In such a state, the sun shield 1 is usually in the non-usage position.

In particular, the sun shield 1, i.e., the light outlet surface L of the light source 5, is positioned in relation to the occupant 6, to whom the sun shield 1 is allocated in terms of seating, in such a way that the biologically effective light is detected by receptors of the eyes 7 of the occupant 6 without the occupant 6 being dazzled. In other words, the biologically effective light emitted by means of the light source 5 reaches the eye 7 of the occupant 6 when the sun shield 1 is in the non-usage position.

According to the exemplary embodiment shown in FIGS. 1 and 2, the covering element 4 is formed as a sliding covering S, wherein a view of the illumination unit 2, in particular of the light outlet surface L, is possible after lateral shifting of the sliding covering S from right to left. A grip element G is arranged or formed on the covering element 4 in the form of the sliding covering S for improved handling of the sliding covering S, i.e., for improved shifting.

The covering element 4 can be designed from an identical or adjusted material, in particular in relation to the surface structure and color, to the surroundings of the covering element 4, i.e., a region surrounding it of the surface side of the sun shield 1.

If the covering element 4 is formed from the same material as the sun shield 1 on this surface side and thus has the same surface structure and color, then the covering element 4 is comparatively unobtrusive in terms of its closed position. Failing that, the covering element 4 can serve as an eyecatcher and have a corresponding surface structure and/or color.

In an embodiment of the illumination unit 2 integrated into the sun shield 1, the covering element 4 can function as a switching element for activating and deactivating the light source 5, i.e., for switching it on and off.

The light source 5 is thus switched on when the covering element 4, according to the present exemplary embodiment the sliding covering S, is opened. If the covering element 4 is closed, such that the light outlet surface L of the light source is covered, this is deactivated, i.e., switched off. The covering element 4 can thus form a switching unit of the illumination unit 2 or alternatively is in effective connection at least with a switching unit for switching the light source 5 on and off.

If the switching unit is defective, such that the light source 5 cannot be deactivated and biologically effective light is continuously emitted, then the light source 5 can be covered by means of the covering element 4, such that the risk of dazzling the occupant 6, to whose seat the sun shield 1, i.e., the light outlet surface L, is allocated, is extensively precluded.

Figure 3:
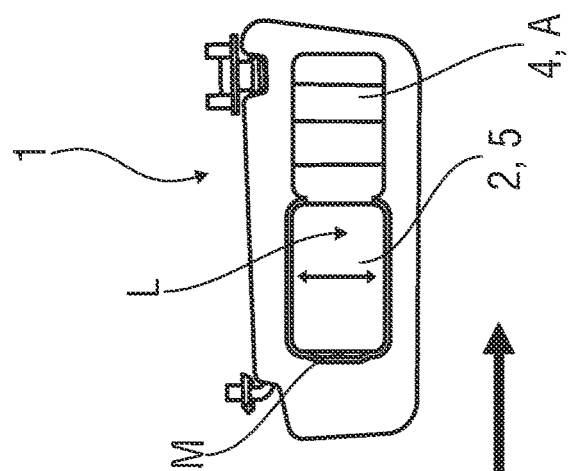
Figure 4:
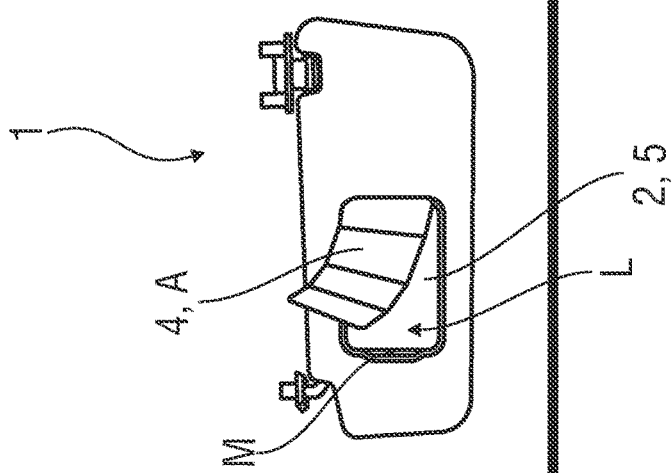
Figure 5:
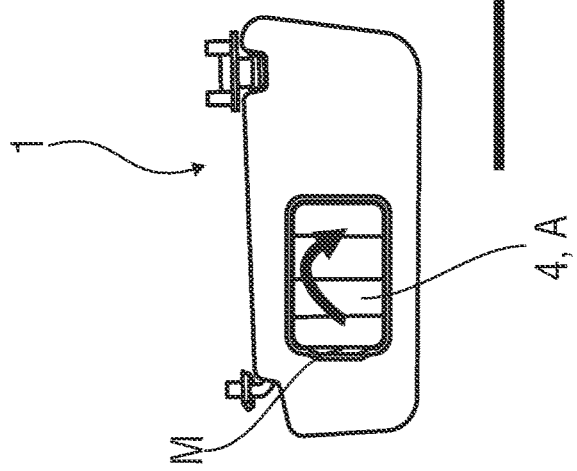

FIGS. 3 to 5 show the sun shield 1 having a covering element 5 formed as a flexible creasing covering A for covering the light source 5 of the illumination unit 2. In FIG. 3, the creasing covering A is shown in the closed position, wherein the light source 5 is completely covered. FIG. 4 shows the covering element 4 in the form of the creasing covering A in the partially folded back state and in FIG. 5, the covering element 4 of the illumination unit 2 is depicted in the open position, such that a light outlet surface L of the light source 5 is completely exposed.

The covering element 4 designed as a creasing cover A can be folded back from left to right to expose the light outlet surface L, such that a handling of the covering element 4 is relatively simple at least for a driver as the occupant 6.

A recessed grip M is formed on the sun shield 1 to the left of the covering element 4 designed as a creasing covering A, such that gripping the creasing covering A is possible in an extensively unproblematic manner.

In the folded back state, i.e., in the open position, of the creasing cover A, it can be fixed on the surface side of the sun shield 1, wherein the fixing can be implemented magnetically, for example, by means of a Velcro and/or button connection.

In an embodiment of the covering element 4 not depicted in more detail, it is formed as a flexible folding covering, such that a width of such a creasing covering A is reduced in the open position and accordingly there is a smaller space requirement. In this embodiment, the covering element 4 can also be fixed in the open position, such that the covering element 4 can be prevented from pivoting caused by the driving operation.

In FIG. 6, a cut-out of a vehicle 3, in particular a vehicle roof 8, is shown, wherein a driver is additionally depicted as the occupant 6 of the vehicle 3.

In FIG. 6, in addition to the sun shield 1, various further installation positions E2 to E5 of the illumination unit 2 are also depicted as the installation position E1.

A second installation position E2 is in the roof region, in particular on the roof liner, wherein the illumination unit 2 is only visible when the sun shield 1 is in the usage position.

A third installation position E3 is in front of the sun shield 1 in the driving direction x of the vehicle 3 in the roof region, wherein a fourth installation position E4 is arranged behind the sun shield 1 in the driving direction x.

A fifth installation position E5 is positioned in the roof region between the two B columns of the vehicle 3 (not depicted in more detail), for example in the region of a mirror and/or roller blind. If the vehicle 3 has a glass roof, sun shields 1 are also provided for occupants 6 in the back seat region, into which sun shields an illumination unit can be integrated in each case for emitting biologically effective light. The arrangement of such an illumination unit 2 in a back seat cosmetic mirror or in a different position suitable for an occupant 6 in the front region or back seat region of the vehicle 3 is also conceivable.

Regardless of the installation position E1 to E5 of the illumination unit 2, a covering element 4 is always provided by means of which the light outlet surface L of the light source 5 can be covered.

FIG. 7 shows a cut-out of the vehicle 3 with the occupant 6 and a region of incident angles for an eye 7 of the occupant 6.

In addition, the light outlet surface L of the activated light source 5 of the illumination unit 2 is depicted, wherein an angle α between a front edge K1 of the light outlet surface L in the non-usage position of the sun shield 1 and a straight outlook line GL of the occupant 6 can be, for example, 15°, and an angle β between a rear edge K2 of the light outlet surface L and the straight outlook line GL can be, for example, 21°.

In such a position of the light outlet surface L, the eye 7 of the occupant 6 detects the biologically effective light of the light source 5, wherein the occupant 6 being dazzled by this light can be extensively precluded.

For example, an intensity of the biologically effective light emitted by means of the light source 5 can be controlled by means of an illumination strength and a color temperature of a surroundings light of the occupant 6, wherein at least one detection unit is provided to do so for detecting the illumination strength and the color temperature of the surroundings light.

In a possible embodiment, it can be provided that the activation and deactivation of the illumination unit 2 is carried out depending on detected signals of the detection unit. If the illumination strength, in particular, falls below a predetermined value, it can be provided that an indication to the occupant 6, in particular the driver of the vehicle 3, is emitted to activate the illumination unit 2 and/or to expose the light outlet surface L by corresponding positioning of the covering element 4.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An illumination unit for an interior chamber of a vehicle, the illumination unit comprising:
   at least one light source integrated into a surface side of a sun shield of the vehicle facing towards an occupant of the vehicle in a non-usage position of the sun shield, wherein, in an activated state, the at least one light source is configured to emit light directed towards the occupant; and
   a covering element arranged on the surface side of the sun shield facing towards the occupant of the vehicle in the non-usage position of the sun shield and covering a light outlet surface of the at least one light source,
   wherein the at least one light source emits, at an angle, biologically effective light outside a visible range of a driver at least in a driving operation of the vehicle, wherein the angle is 6° between a first line from the driver's eye to a front edge of the at least one light source and a second line from the driver's eye to a rear edge of the at least one light source.

2. The illumination unit of claim 1, wherein the covering element is connected to a switching unit configured to activate and deactivate the at least one light source.

3. The illumination unit of claim 1, wherein the at least one light source is activated when the covering element is open and is deactivated when the covering element is closed.

4. The illumination unit of claim 1, wherein the covering element is a sliding covering, folding covering, or creasing covering, and is fixable in an open position.

5. The illumination unit of claim 1, further comprising:
   at least one detection unit configured to detect an illumination strength of a surroundings light of the occupant, wherein the at least one light source is activatable depending on the detected illumination strength.

6. The illumination unit of claim 1, wherein the covering element is of a same material as a cladding of the sun shield.

7. The illumination unit of claim 1, wherein the light outlet surface of the at least one light source is configured to diffusely scatter light.

8. The illumination unit of claim 1, wherein the at least one light source is an LED surface light.

9. A vehicle, comprising:
   a sun shield;
   an illumination unit, comprising
      at least one light source integrated into a surface side of the sun shield facing towards an occupant of the vehicle in a non-usage position of the sun shield, wherein, in an activated state, the at least one light source is configured to emit light directed towards the occupant; and
      a covering element arranged on the surface side of the sun shield facing towards the occupant of the vehicle in the non-usage position of the sun shield and covering a light outlet surface of the at least one light source,
   wherein the at least one light source emits, at an angle, biologically effective light outside a visible range of a driver at least in a driving operation of the vehicle, wherein the angle is 6° between a first line from the driver's eye to a front edge of the at least one light source and a second line from the driver's eye to a rear edge of the at least one light source.

* * * * *